(12) United States Patent
Ma et al.

(10) Patent No.: US 9,121,984 B2
(45) Date of Patent: Sep. 1, 2015

(54) BACKLIGHT UNIT AND LIQUID CRYSTAL DISPLAY USING THE SAME

(71) Applicant: BEIJING BOE OPTOELECTRONICS TECHNOLOGY CO., LTD., Beijing (CN)

(72) Inventors: Qing Ma, Beijing (CN); Daekeun Yoon, Beijing (CN); Fei Shang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 435 days.

(21) Appl. No.: 13/805,119

(22) PCT Filed: Sep. 28, 2012

(86) PCT No.: PCT/CN2012/082293
§ 371 (c)(1),
(2) Date: Dec. 18, 2012

(87) PCT Pub. No.: WO2013/044842
PCT Pub. Date: Apr. 4, 2013

(65) Prior Publication Data
US 2014/0071380 A1    Mar. 13, 2014

(30) Foreign Application Priority Data
Sep. 29, 2011   (CN) .......................... 2011 1 0295310

(51) Int. Cl.
G02F 1/1335   (2006.01)
F21V 8/00    (2006.01)

(52) U.S. Cl.
CPC ............ *G02B 6/0051* (2013.01); *G02B 6/0078* (2013.01); *G02F 1/133504* (2013.01); *G02B 6/0058* (2013.01); *G02F 1/133615* (2013.01)

(58) Field of Classification Search
USPC .......................................... 349/64
See application file for complete search history.

(56) References Cited

U.S. PATENT DOCUMENTS

2008/0101068 A1   5/2008   Kitamura et al.
2010/0060818 A1   3/2010   Ajichi et al.
(Continued)

FOREIGN PATENT DOCUMENTS

CN    2696005 Y    4/2005
CN    101373235 A   2/2009
(Continued)

OTHER PUBLICATIONS

First Chinese Office Action dated Jun. 28, 2013, Appln. No, 201110295310.7.
(Continued)

*Primary Examiner* — Lucy Chien
(74) *Attorney, Agent, or Firm* — Ladas & Parry LLP

(57) ABSTRACT

The disclosure discloses a backlight unit and a liquid crystal display comprising thereof. The backlight unit comprises a light guiding plate comprising a plurality of light guiding plate units, which are arranged as a matrix along longitudinal and traversal directions, with line-shaped gaps extending respectively along traversal or longitudinal direction existing between two adjacent light guiding plate units; a light source provided at a side of light guiding plate; and a diffusing sheet provided above the light guiding plate. At a position corresponding to the line-shaped gap between the two adjacent light guiding plate units, the diffusing sheet has a shape of line-shaped projection, and the line-shaped projection has a projected direction in a direction of the light emitted from the light guiding plate unit. According to the disclosure, the uniformity of the backlight may be improved.

18 Claims, 2 Drawing Sheets

(56) References Cited

U.S. PATENT DOCUMENTS

| | | |
|---|---|---|
| 2011/0026243 A1 | 2/2011 | Lee et al. |
| 2011/0164404 A1 | 7/2011 | Kasai |
| 2011/0235308 A1 | 9/2011 | Kang et al. |
| 2012/0182761 A1 | 7/2012 | Ikuta et al. |

FOREIGN PATENT DOCUMENTS

| | | |
|---|---|---|
| CN | 101680636 A | 3/2010 |
| CN | 101988662 A | 3/2011 |
| CN | 102105739 A | 6/2011 |
| CN | 102165248 A | 8/2011 |
| CN | 102200659 A | 9/2011 |
| CN | 102654260 A | 9/2012 |
| JP | 2001-133631 A | 5/2001 |
| JP | 2009-244405 A | 10/2009 |

OTHER PUBLICATIONS

Second Chinese Office Action dated Feb. 8, 2014; Appln. No. 201110295310.7.

International Search Report mailed Jan. 10, 2013; PCT/CN2012/082293.

International Preliminary Report on Patentability: dated Apr. 1, 2014; PCT/CN2012/082293.

First Chinese Office Action dated Jun. 28, 2013; Appln. No. 201110295310.7.

Second Chinese Office Action dated Feb. 8, 2014, Appln. No. 201110295310.7.

Chinese Notice of Grant; Issuing Date: Jul. 24, 2014; Appln. No. 201110295310.7.

Granted Claims in the CN Application CN201110295310.7.

Issued Patent CN201110295310.7.

BACKLIGHT UNIT AND LIQUID CRYSTAL DISPLAY USING THE SAME

BACKGROUND

The disclosure relates to a backlight unit and liquid crystal display.

During the process of accomplishing the excellent image display of a liquid crystal display, the design of a backlight is especially important. The backlight comprises a light source (point light source or line light source or the like), a light guiding plate and a diffusing sheet. The light emitted from the light source enters into the light guiding plate so as to form a relative uniform surface light source under the effect of the light guiding plate. The diffusing sheet may make the light transmitted from the light guiding plate more uniform. The backlight emits the adjusted relatively uniform light into a display panel for displaying. Currently, the light guiding plate is usually divided into several light guiding plate units so as to individually control the respective light guiding plate units in order to enable local adjustment of light.

FIG. 1 is a top schematic view of a conventional backlight unit having a plurality of light guiding plate units 1-9. As shown in FIG. 1, a gap 10 is present between two adjacent light guiding plate units, which causes the emitted light from the gap 10 having irregular directions. This results in a non-uniform light intensity distribution of the backlight units, which in turn leads to non-uniform brightness of a display. The sheet-like diffusing sheet in the conventional backlight unit may reduce such influence due to the irregular directions of the emitted light only to some degree, thus such adverse effect of non-uniform brightness of the display brightness is still severe to affect the overall performance of the liquid crystal display.

SUMMARY

According to a first aspect of the disclosure, a backlight unit is provided. The backlight unit comprises: a light guiding plate comprising a plurality of light guiding plate units arranged in a matrix along longitudinal and traversal directions respectively, with line-shaped gaps extending along traversal or longitudinal direction respectively between two adjacent light guiding plate units; a light source provided on a side of the light guiding plate; and a diffusing sheet provided above the light guiding plate. The diffusing sheet has a line-shaped projection corresponding to the line-shaped gap between the two adjacent light guiding plate units, the line shaped projection has a projection direction in a direction of light emitted from the light guiding plate unit.

In one embodiment, the line-shaped projection has a cross sectional shape of a semicircle.

In one embodiment, the diffusing sheet has a hemispherical projection corresponding to an intersection of crossing gaps extending along longitudinal and traversal directions respectively, the hemispherical projection jointed with the line-shaped projection smoothly and has a projection direction in a direction of light emitted from the light guiding plate.

In one embodiment, the hemispherical projection is disposed directly above the corresponding intersection.

In one embodiment, the line-shaped projection and the hemispherical projection have a same height.

In one embodiment, the line-shaped projection has a width the same as a diameter of the hemispherical projection.

In one embodiment, the diffusing sheet has a planar shape directly above each light guiding plate unit.

In one embodiment, the diffusing sheet is made of polyester terephthalate (PET).

In one embodiment, the diffusing sheet has a thickness less than 1 mm.

According to a second aspect of the disclosure, there is provided a liquid crystal display comprising a liquid crystal display panel and the backlight unit described above.

According to the backlight unit and the liquid crystal display having the backlight unit, the diffusing sheet has a line-shaped projection corresponding to the line-shaped gap between the two adjacent light guiding plate units, such that stray lights with irregular directions emitted from the gap will become uniform after transmitting through the line-shaped projection. Further, the diffusing sheet has a hemispherical projection corresponding to an intersection of crossing gaps extending along longitudinal and traversal directions respectively and the hemispherical projection is jointed with the line-shaped projection smoothly, such that lights with irregular directions emitted from the intersection of the gaps becomes more uniform after transmitting through the hemispherical projection. In this way, the uniformity of the backlight can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION

In order to achieve objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can conceive other embodiment(s) within the scope and spirit of the present disclosure.

Figure 1:
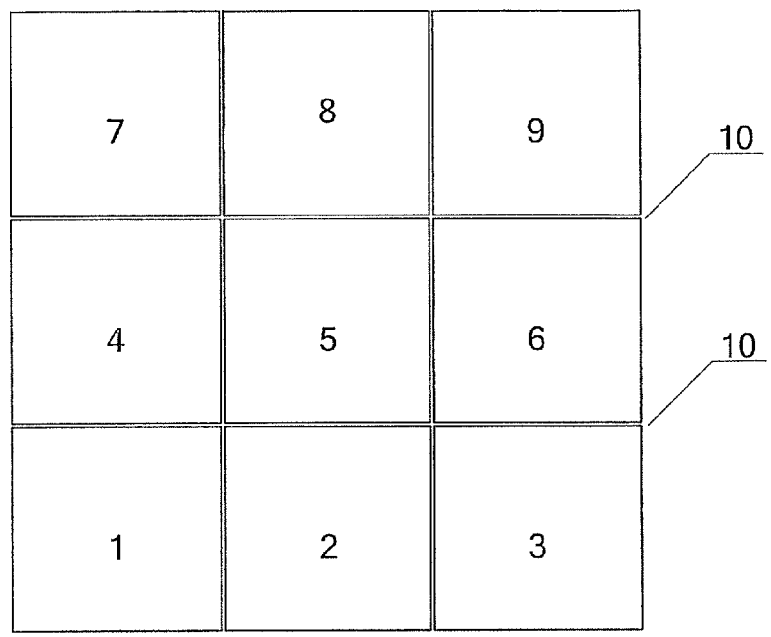
FIG. 1 a schematic top view of a conventional backlight unit having a plurality of light guiding plate units.
Figure 2:
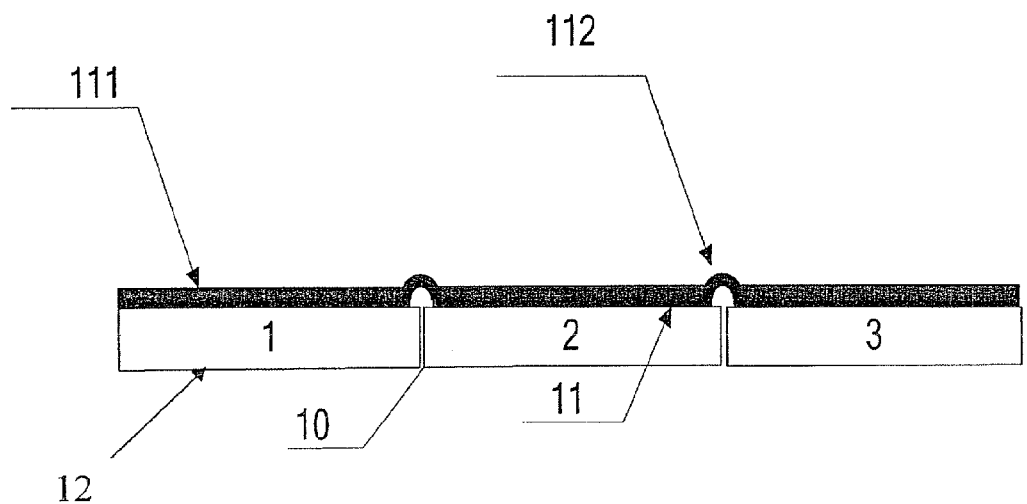
FIG. 2 a schematic side cross sectional view of a backlight unit according to a first embodiment of the disclosure.

FIG. 2 is a schematic side cross sectional view of a backlight unit according to a first embodiment of the disclosure. As shown in FIG. 2, the backlight unit comprises: a light guiding plate 12 comprising a plurality of light guiding plate units 1, 2 and 3, a diffusing sheet 11 provided above the light guiding plate 12 and a light source (not shown) provided on a side of the light guiding plate 12. A Line-shaped gap 10 is present between two adjacent light guiding plate units. The diffusing sheet 11 has a planar shape portions 111 corresponding to respective light guiding plate units 1, 2 and 3. For example, the diffusing sheet 11 has a planar shape directly above respective light guiding plate units 1, 2 and 3. The diffusing sheet 11 has a line-shaped projection 112 corresponding to the line-shaped gap 10. For example, the line-shaped projection 112 is disposed directly above the corresponding line-shaped gap 10. The line-shaped projection 112 has a cross sectional shape of a semicircular and the projected direction of line-shaped projection 112 is in a direction of the light emitted from the light guiding plate 12. As shown in FIG. 2, the projected direction of line-shaped projection 112 is directed upwards.

The light source may be a point light source or a line light source etc. It is noted that only the light guiding plate and the diffusing sheet in the backlight unit are shown in the drawings of the present disclosure without showing other components in the backlight unit since the disclosure mainly relates to the light guiding plate and the diffusing sheet in the backlight unit. Furthermore, the light guiding plate units may be arranged in a matrix along longitudinal and traversal directions as shown in FIG. 2, with the line-shaped gap extending along traversal or longitudinal direction between two adjacent light guiding plate units. In all embodiments of the disclosure a backlight refers to a light emitted from the backlight unit.

Figure 3:
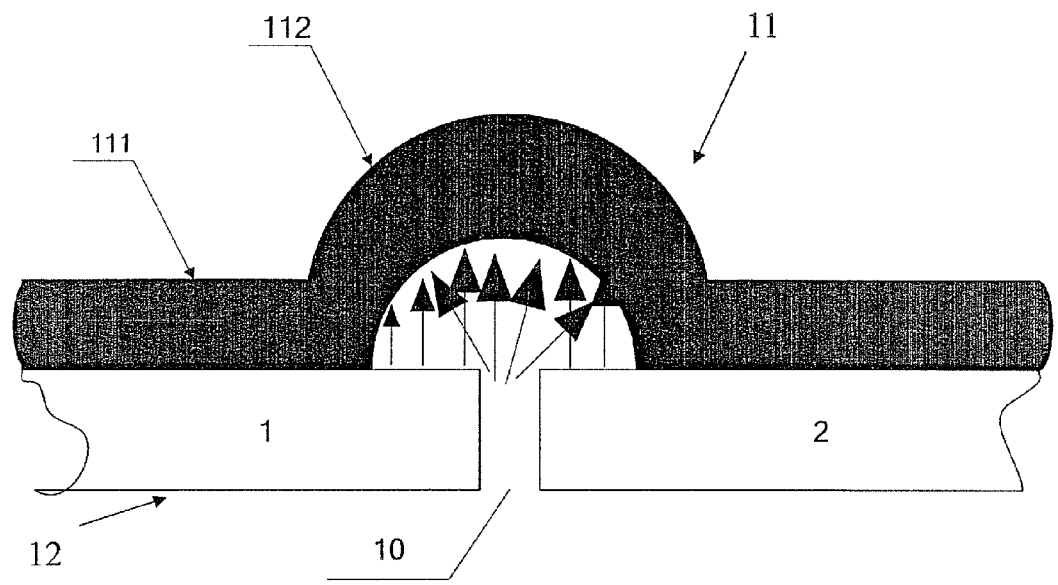
FIG. 3 is a schematic partially enlarged view of the backlight unit shown in FIG. 2.

As shown in the enlarged drawing of FIG. 3, when the light is emitted from the light guiding plate 12, stray lights (as shown by arrows) with irregular directions are emitted from the gap 10 between adjacent light guiding plate units 1 and 2. The stray lights enter into the line-shaped projection 112 which diverges the stray light to emit more uniform light so as to improve the uniformity of the backlight.

Figure 4:
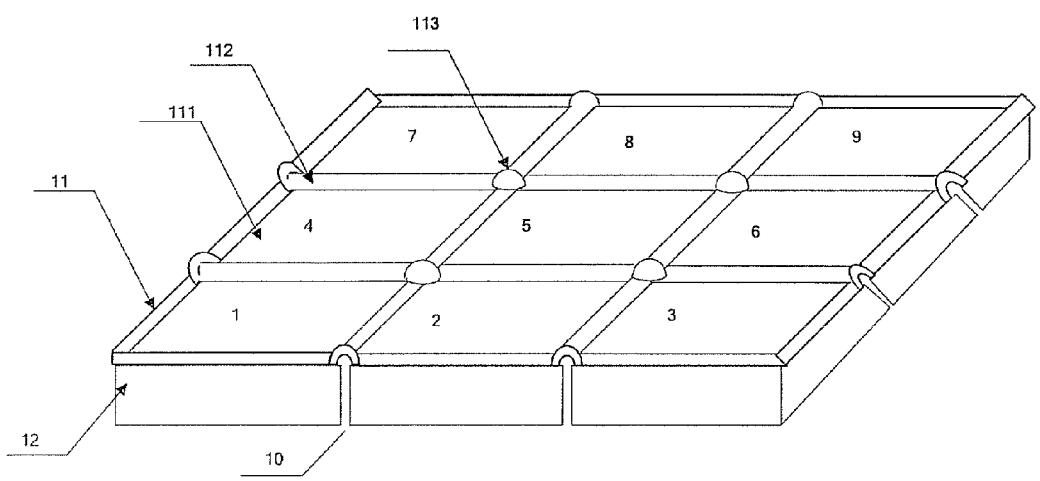
FIG. 4 is a schematic perspective view of backlight unit according to a second embodiment of the disclosure.

In the backlight unit according to second embodiment of the disclosure, as shown in FIG. 4, the backlight unit comprises a light guiding plate 12, a light source (not shown) provided on a side of the light guiding plate 12 and diffusing sheets 11 provided above the light guiding plate 12. The light guiding plate 12 comprises a plurality of light guiding plate units 1-9 arranged in a matrix along longitudinal and traversal directions respectively. Line-shaped gaps 10 are present between adjacent light guiding plate units. The diffusing sheet 11 has a planar shape portions 111 corresponding to respective light guiding plate units 1-9. For example, the diffusing sheet 11 has a planar shape directly above respective light guiding plate units 1-9. The diffusing sheet 11 has a line-shaped projection 112 corresponding to the line-shaped gap 10. For example, the line-shaped projection 112 is disposed directly above the corresponding line-shaped gap 10. The line-shaped projection 112 has a cross sectional shape of a semicircular and the projected direction of line-shaped projection 112 is in a direction of the light emitted from the light guiding plate 12. As shown in FIG. 4, the projected direction of line-shaped projection 112 is directed upwards. The diffusing sheet 11 has a hemispherical projection 113 corresponding to an intersection of two crossing gaps 10 extending along longitudinal and traversal directions respectively. For example, the hemispherical projection 113 is disposed directly above the corresponding intersection. The hemispherical projection 113 is jointed with the associated line-shaped projections 112 smoothly and the projected direction of the hemispherical projection 113 is in the direction of light emitted from the light guiding plate 12. As shown in FIG. 4, the projected direction of the hemispherical projection 113 is directed upwards. When the light is emitted from the light guiding plate 12, stray lights with irregular directions are emitted from the intersection of crossing gaps 10. The stray lights enter into the hemispherical projection 113 which diverges the stray light to emit more uniform light so as to improve the uniformity of the backlight.

Further, the line-shaped projection 112 and the hemispherical projection 113 have a same height and the line-shaped projection 112 has a width the same as a diameter of the hemispherical projection 113. In this case, the hemispherical projection 113 and the associated crossing line-shaped projections 112 can be jointed more smoothly, so that the emitted light is more uniform so as to further improve the uniformity of the backlight.

Preferably, in the backlight unit discussed above, the diffusing sheet can be made of PET (Polyester Terephthalate) material and the diffusing sheet can have a thickness less than 1 mm.

It is noted that the backlight unit in the embodiments of the disclosure is a side type backlight. Thus, the light source(s) is provided on the side of the light guiding plate.

The disclosure also provides a liquid crystal display using the backlight unit described above. The liquid crystal display comprises a liquid crystal display panel and a backlight unit, wherein the backlight unit may be any backlight unit in the embodiments described above.

A light emitted from the backlight unit is a backlight which enters the liquid crystal display panel to enable displaying of the liquid crystal display panel.

In the present disclosure, the line-shaped projection of the diffusing sheet has a cross section shape of a semicircle. However, the disclosure is not limited thereto, and the cross section of the line-shaped projection may also have other suitable shape, such as an arc, polygon etc., as long as the shape of the projection can cause the emitted light more uniform.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A backlight unit comprising:
   a light guiding plate comprising a plurality of light guiding plate units arranged in a matrix along longitudinal and traversal directions respectively, with line-shaped gaps extending along traversal or longitudinal direction respectively between two adjacent light guiding plate units;
   a light source provided on a side of the light guiding plate; and
   a diffusing sheet provided above the light guiding plate,
   wherein the diffusing sheet has a line-shaped projection corresponding to the line-shaped gap between the two adjacent light guiding plate units, the line shaped projection has a projection direction in a direction of light emitted from the light guiding plate unit; and the line-shaped projection has a cross sectional shape of a semicircle.

2. The backlight unit according to claim 1, wherein the line-shaped projection is disposed directly above the corresponding line-shaped gap.

3. The backlight unit according to claim 1, wherein the diffusing sheet has a hemispherical projection corresponding to an intersection of crossing gaps extending along longitudinal and traversal directions respectively, the hemispherical projection jointed with the line-shaped projection smoothly and has a projection direction in a direction of light emitted from the light guiding plate.

4. The backlight unit according to claim 3, wherein the hemispherical projection is disposed directly above the corresponding intersection.

5. The backlight unit according to claim 3, wherein the line-shaped projection and the hemispherical projection have a same height.

6. The backlight unit according to claim 5, wherein the line-shaped projection has a width the same as a diameter of the hemispherical projection.

7. The backlight unit according to claim 6, wherein the diffusing sheet has a planar shape at a position corresponding to each light guiding plate unit.

8. The backlight unit according to claim 1, wherein the diffusing sheet is made of polyester terephthalate (PET).

9. The backlight unit according to claim 1, wherein the diffusing sheet has a thickness less than 1 mm.

10. A liquid crystal display comprising:
a liquid crystal display panel; and
a backlight unit comprising:
  a light guiding plate comprising a plurality of light guiding plate units arranged in a matrix along longitudinal and traversal directions respectively, with line-shaped gaps extending along traversal or longitudinal direction respectively between two adjacent light guiding plate units;
  a light source provided on a side of the light guiding plate; and
  a diffusing sheet provided above the light guiding plate, wherein the diffusing sheet has a line-shaped projection corresponding to the line-shaped gap between the two adjacent light guiding plate units, the line shaped projection has a projection direction in a direction of light emitted from the light guiding plate unit; and the line-shaped projection has a cross sectional shape of a semicircle.

11. The liquid crystal display according to claim 10, wherein the line-shaped projection is disposed directly above the corresponding line-shaped gap.

12. The liquid crystal display according to claim 10, wherein the diffusing sheet has a hemispherical projection corresponding to an intersection of crossing gaps extending along longitudinal and traversal directions respectively, the hemispherical projection jointed with the line-shaped projection smoothly and has a projection direction in a direction of light emitted from the light guiding plate.

13. The liquid crystal display according to claim 12, wherein the hemispherical projection is disposed directly above the corresponding intersection.

14. The liquid crystal display according to claim 12, wherein the diffusing sheet has a planar shape at a position corresponding to each light guiding plate unit.

15. The liquid crystal display according to claim 12, wherein the line-shaped projection and the hemispherical projection have a same height.

16. The liquid crystal display according to claim 12, wherein the line-shaped projection has a width the same as a diameter of the hemispherical projection.

17. The liquid crystal display according to claim 10, wherein the diffusing sheet is made of polyester terephthalate (PET).

18. The liquid crystal display according to claim 10, wherein the diffusing sheet has a thickness less than 1 mm.

* * * * *